United States Patent
Jeong et al.

(10) Patent No.: US 12,137,293 B2
(45) Date of Patent: Nov. 5, 2024

(54) IMAGING SYSTEM AND METHOD FOR IMPROVED IMAGE DETECTION

(71) Applicant: SAMSUNG ELECTRONICS CO., LTD., Suwon-si (KR)

(72) Inventors: Inje Jeong, Suwon-si (KR); Sujong Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 115 days.

(21) Appl. No.: 17/973,095

(22) Filed: Oct. 25, 2022

(65) Prior Publication Data
US 2023/0171520 A1 Jun. 1, 2023

(30) Foreign Application Priority Data

Nov. 26, 2021 (KR) .................. 10-2021-0166169
May 2, 2022 (KR) .................. 10-2022-0054395

(51) Int. Cl.
*H04N 25/75* (2023.01)
*H04N 25/71* (2023.01)

(52) U.S. Cl.
CPC ........... *H04N 25/75* (2023.01); *H04N 25/745* (2023.01)

(58) Field of Classification Search
CPC ..... H04N 25/75; H04N 25/745; H04N 25/617
See application file for complete search history.

(56) References Cited

U.S. PATENT DOCUMENTS

| | | | |
|---|---|---|---|
| 6,593,966 B1 | 7/2003 | Watanabe | |
| 8,949,640 B2 | 2/2015 | Minami | |
| 9,906,753 B2 | 2/2018 | Nakajima et al. | |
| 9,912,888 B2 | 3/2018 | Kim | |
| 10,277,807 B2 | 4/2019 | Song | |
| 10,445,851 B2 | 10/2019 | Song | |
| 2013/0002901 A1 | 1/2013 | Athreya | |
| 2017/0019567 A1* | 1/2017 | Konno | H04N 25/65 |
| 2019/0086633 A1* | 3/2019 | Kim | H04N 23/6812 |
| 2020/0244875 A1 | 7/2020 | Lee et al. | |
| 2021/0044773 A1* | 2/2021 | Okada | H04N 25/42 |

FOREIGN PATENT DOCUMENTS

| | | |
|---|---|---|
| JP | 3999496 B2 | 10/2007 |
| JP | 2008-245000 A | 10/2008 |

* cited by examiner

*Primary Examiner* — Padma Haliyur
(74) *Attorney, Agent, or Firm* — Fish & Richardson P.C.

(57) ABSTRACT

In an image sensor, an analog-to-digital conversion circuitry generates image data by sequentially performing analog-to-digital conversion processing twice or more on a pixel signal transferred from the pixel array in an operation period of one horizontal cycle, and an image signal processing circuitry receives the image data and performs digital processing on the image data. A timing controller controls the image signal processing circuitry to hold the digital processing during a plurality of holding periods that respectively correspond to portions of two or more ADC processing periods.

16 Claims, 15 Drawing Sheets

IMAGING SYSTEM AND METHOD FOR IMPROVED IMAGE DETECTION

CROSS-REFERENCE TO RELATED APPLICATION

This application claims priority to and the benefit of Korean Patent Application No. 10-2021-0166169 filed in the Korean Intellectual Property Office on Nov. 26, 2021, and priority to and the benefit of Korean Patent Application No. 10-2022-0054395 filed in the Korean Intellectual Property Office on May 2, 2022, the entire contents of which are incorporated herein by reference.

BACKGROUND

(a) Field

The disclosure relates to an image sensor, an imaging system including the same, and a method executed by the imaging system.

(b) Description of the Related Art

An image sensor generates an electrical signal that varies depending on an amount of incident light, and processes the electrical signal to generate image data. Therefore, analog circuitry and digital circuitry are simultaneously involved when the image sensor generates the image data. In general, since digital circuitry performs complex functions, it may operate irregularly within a unit. Accordingly, power consumption may be not constant on a time axis, because ground coupling may occur. Ground coupling noise may also adversely affect the performance of the analog circuitry.

An operation period of an analog processing operation (in particular, an analog-to-digital conversion operation) and an operation period of a digital processing operation may be separated by utilizing a blank time in a processing time assigned to the analog processing operation and the digital processing operation. For example, the operation period of the analog-to-digital conversion operation and the operation period of the digital processing operation may be separated by performing the analog-to-digital conversion operation during the blank time of the digital processing operation period. However, if sufficient blank time is not provided, the operation periods may not be separated. In particular, in the modern image sensor that is oriented toward high-speed operation, it may not be possible to secure a sufficient operation period.

SUMMARY OF THE INVENTION

Some embodiments may provide an image sensor, an imaging system including the image sensor, and a method executed by the imaging system, for reducing the influence of a digital processing operation in an analog-to-digital conversion operation.

According to some embodiments, an image sensor including a pixel array, an analog-to-digital conversion (ADC) circuitry, an image signal processing circuitry, and a timing controller may be provided. The analog-to-digital conversion circuitry may generate image data by sequentially performing ADC processing twice or more times on a pixel signal transferred from the pixel array in an operation period of one horizontal cycle. The image signal processing circuitry may store the image data and perform digital processing on the image data. A timing controller may control the image signal processing circuitry to hold the digital processing during a plurality of holding periods that respectively correspond to portions of two or more ADC processing periods in each of which the ADC processing is performed.

In some embodiments, each of the portions may be a period in which a digital code corresponding to least significant bits (LSBs) of a predetermined number or less is decided from the pixel signal by the ADC processing.

The timing controller may set the holding periods corresponding to the portions of the ADC processing periods, respectively.

In some embodiments, the portions may include periods in which a pixel signal whose grayscale value is lower than a threshold is analog-to-digital converted in the ADC processing.

In some embodiments, the timing controller may transfer to the image signal processing circuitry a hold processing signal having a plurality of pulses that correspond to the plurality of holding periods, respectively, and the image signal processing circuitry may hold the digital processing in response to each of the plurality of pulses.

In some embodiments, the image signal processing circuitry may include an image signal processor configured to perform the digital processing, and a line memory configured to store the image data, and read the image data and transfer the image data to the image signal processor. The timing controller may transfer the hold processing signal to the line memory, and the line memory may stop an operation of reading the image data in response to each of the plurality of pulses.

In some embodiments, the image signal processing circuitry may include a plurality of image signal processors configured to sequentially perform the digital processing, and a plurality of line memories respectively corresponding to the plurality of image signal processors and each configured to store data on which the digital processing is to be performed by a corresponding one of the image signal processors. The timing controller may transfer the hold processing signal to the plurality of line memories, and each of the plurality of line memories may stop an operation of reading the data in response to each of the plurality of pulses.

In some embodiments, the image sensor may further include a processor configured to transfer predetermined information indicating a start time and a width of each of the plurality of pulses to the timing controller. The timing controller may generate the hold processing signal based on the predetermined information.

In some embodiments, the image sensor may further include a memory configured to store firmware, and the processor may generate the predetermined information based on such firmware.

In some embodiments, the processor may determine the width based on a time of the one horizontal cycle, a time required for the digital processing, and a number of times of the ADC processing, and determine the start time of each of the plurality of pulses based on start times of the ADC processing periods and an offset.

In some embodiments, the image signal processing circuitry may operate in response to a clock from the timing controller, and the timing controller may block the clock signal to be transferred to the image signal processing circuitry during the plurality of holding periods.

In some embodiments, the image signal processing circuitry may include a plurality of image signal processors. The plurality of image signal processor may sequentially perform digital processing and may operate in response to the clock. The timing controller may block the clock to be transferred to the plurality of image signal processors during the plurality of holding periods.

In some embodiments, the image sensor may further include a processor configured to transfer predetermined information indicating a start time and a width of each of the plurality of holding periods to the timing controller. The timing controller may block the clock based on the predetermined information.

In some embodiments, the processor may determine the width based on a time of the one horizontal cycle, a time required for the digital processing, and a number of times of the ADC processing, and determine the start time of each of the plurality of holding periods based on start times of the ADC processing periods and an offset.

In some embodiments, the timing controller may control the image signal processing circuitry to allow power consumed in the image signal processing circuitry during each of the plurality of holding periods to be lower than a threshold.

In some embodiments, the timing controller may control the image signal processing circuitry such that a fluctuation value of power consumed in the image signal processing circuitry during each of the plurality of holding periods is lower than a threshold.

According to some embodiments, an imaging system including a first processor and an image sensor may be provided. The first processor may provide start times of ADC processing and an offset. The image sensor may receive the start times and the offset from the first processor, and control an operation of image signal processing based on the start times and the offset.

In some embodiments, the image sensor may include a second processor configured to generate predetermined information based on the starting times and the offset, and a timing controller configured to hold the operation of the image signal processing based on the predetermined information.

In some embodiments, the timing controller may hold the operation of the image signal processing, corresponding to portions of ADC processing periods in each of which the ADC processing is performed. Each of the portions may be a period in which a digital code corresponding to LSBs of a predetermined number or less is decided from a pixel signal by the ADC processing.

In some embodiments, the image sensor may further include a memory configured to store firmware, and the second processor may generate the predetermined information based on the start times and the offset using the firmware.

In some embodiments, the image sensor may perform the ADC processing twice or more during an operation period of one horizontal period. The predetermined information may include a start time and a width of each of a plurality of hold pulses that respectively correspond to portions of two or more ADC processing periods in each of which the ADC processing is performed, and the image sensor may hold the operation of the image signal processing in response to each of the plurality of hold pulses.

According to some embodiments, a method executed by an image system may be provided. The method may include providing start times of ADC processing and an offset, generating predetermined information based on the start times and the offset, and controlling an operation of image signal processing based on the predetermined information while performing the ADC processing twice or more times.

DETAILED DESCRIPTION OF THE PREFERRED EMBODIMENTS

Figure 1:
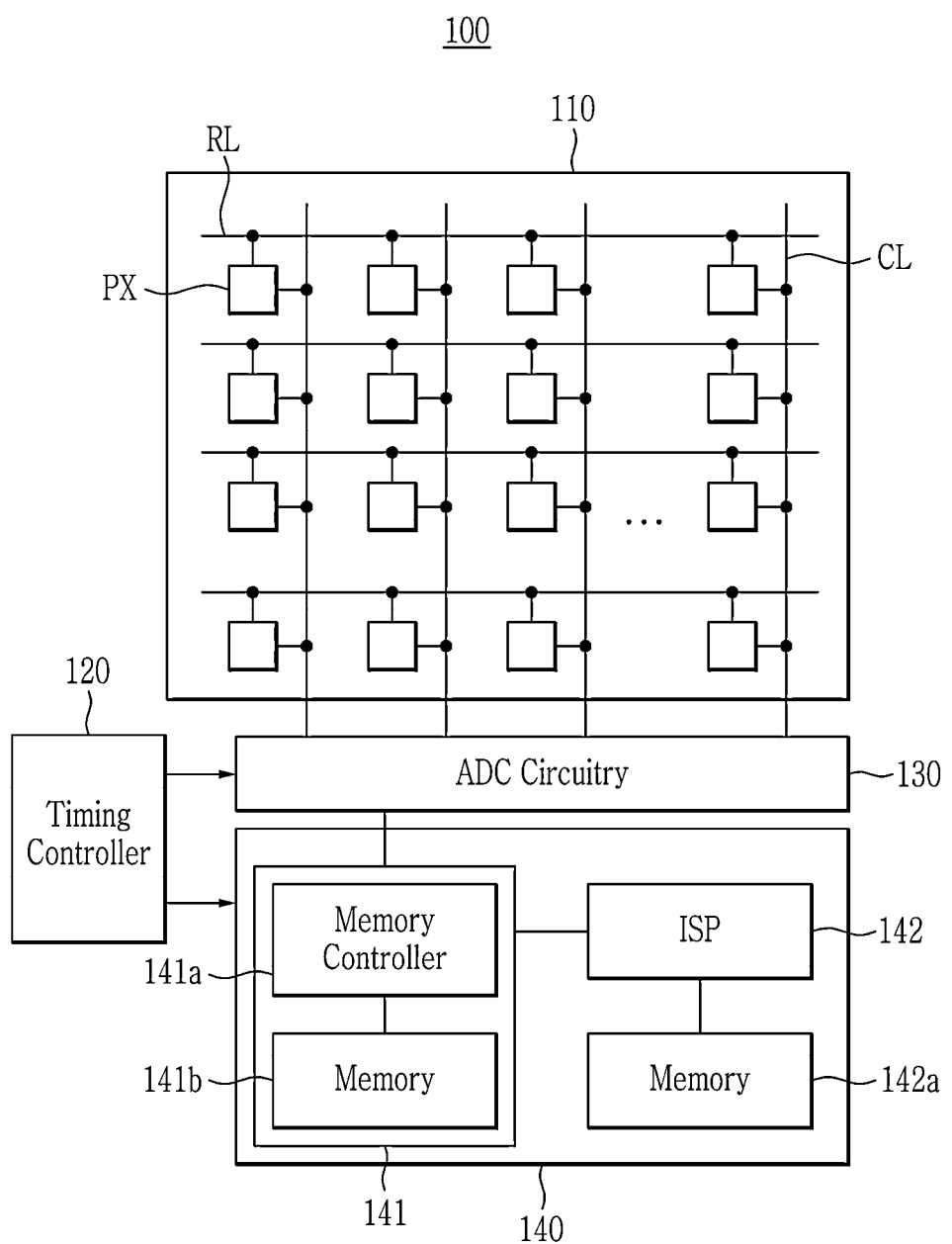
FIG. 1 is an example block diagram of an image sensor according to an embodiment.

In the following detailed description, only certain embodiments of the present invention are shown and described, only by way of illustration. As those skilled in the art would realize, the described embodiments may be modified in various different ways, without departing from the spirit or scope of the present invention.

The drawings and description are to be regarded as illustrative in nature and not limiting. Like reference numerals designate like elements throughout the specification. The sequence of operations or steps is not limited to the order presented, or figures unless specifically indicated otherwise. The order of operations or steps may be changed, several operations or steps may be merged, a certain operation or step may be subdivided, and a specific operation or step may be omitted.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation and no order or numerical value is implied.

Figure 2:
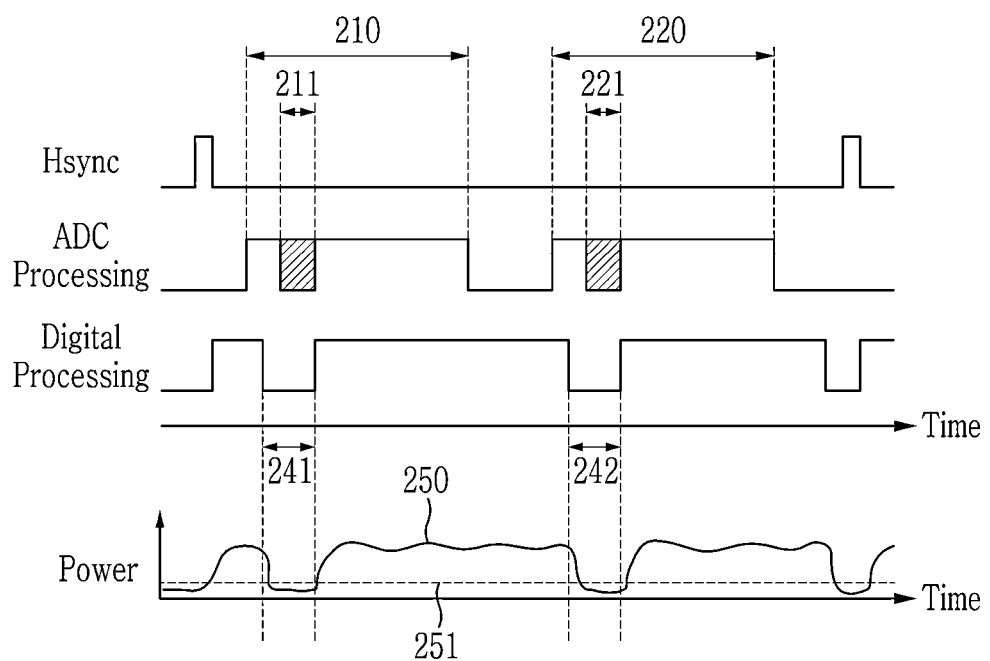
FIG. 2 is an example drawing showing an operation timing of an image sensor according to an embodiment.
Figure 3A:
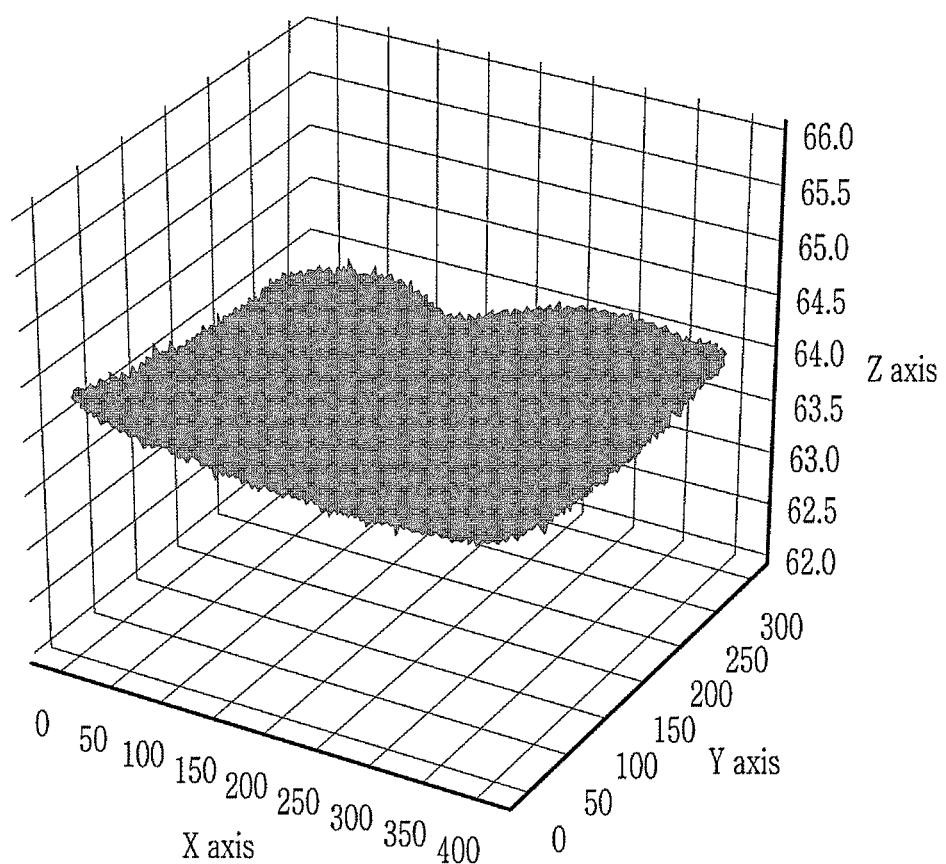
FIG. 3A and FIG. 3B are example drawings showing digital code distribution when a dark image is captured.
Figure 3B:
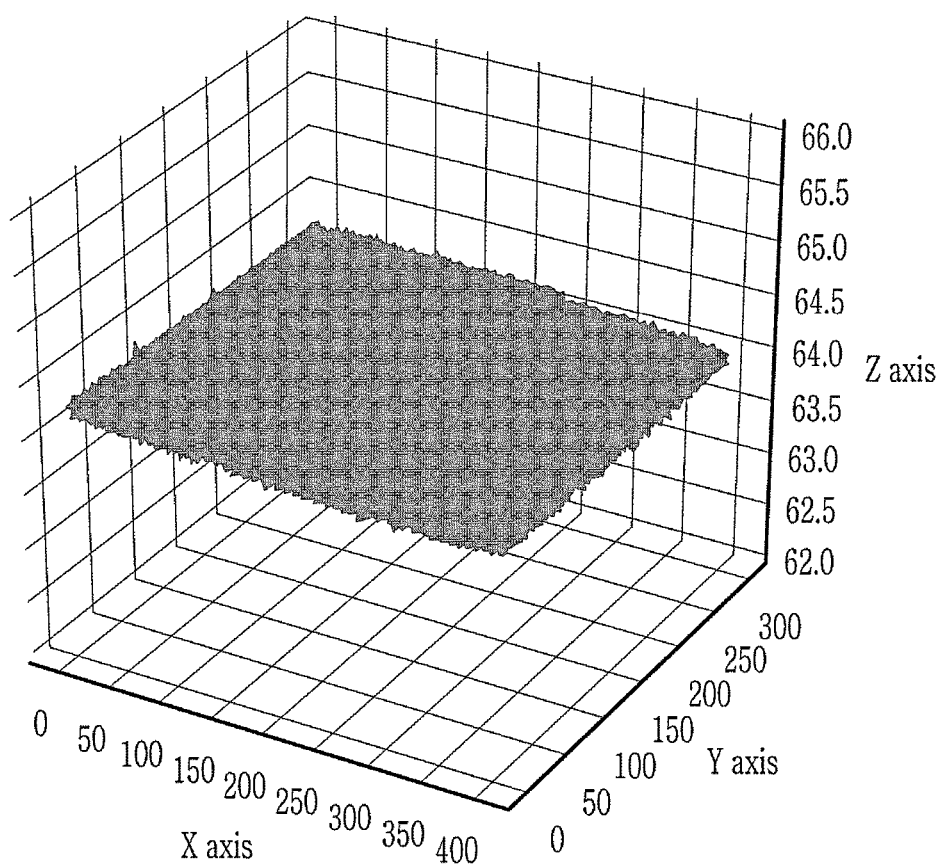

FIG. 1 is an example block diagram of an image sensor according to an embodiment, FIG. 2 is an example drawing showing an operation timing of an image sensor according to an embodiment, and FIG. 3A and FIG. 3B are example drawings showing digital code distribution when a dark image is captured.

Referring to FIG. 1, an image sensor 100 may include a pixel array 110, a timing controller 120, an analog-to-digital conversion circuitry (hereinafter referred to as "ADC circuitry") 130 and an image signal processing circuitry 140. In some embodiments, the image sensor 100 may have a structure in which two substrates are stacked. The image sensor 100 may include a first substrate on which the pixel array 110 is formed, and a second substrate that is connected to the pixel array 110 via interfacing means and that is stacked on the first substrate. The timing controller 120, the ADC circuitry 130 and the image signal processing circuitry 140 may be disposed on the second substrate.

The image sensor 100 may be mounted on an electronic device having an image sensing or optical sensing function. For example, the image sensor 100 may be mounted to electrical devices such as a camera, a smartphone, a wearable device, an Internet of Things (IoT) device, a home appliance, a tablet personal computer (PC), a personal digital assistant (PDA), or a portable multimedia player (PMP), a navigation, a drone, and an advanced driver assistance systems (ADAS). Alternatively, the image sensor 100 may be mounted on an electronic device provided as a component in a vehicle, furniture, manufacturing equipment, a door, various measurement devices, and the like.

The pixel array 110 may include a plurality of pixels PX arranged in a matrix form, and a plurality of row lines RL and a plurality of column lines CL that are connected to the plurality of pixels PX. In some embodiments, each pixel PX may include one or more photoelectric conversion elements (e.g., one or more photodetectors). The photoelectric conversion element may detect incident light and convert the incident light into an electrical signal (hereinafter referred to as a "pixel signal") depending on an amount of light. The row line RL may extend in a row direction and be connected to the pixels PX disposed on the same row. The row line RL may transmit a control signal to devices included in the pixels PX, for example, transistors. The column line CL may extend in a column direction and be connected to the pixels PX disposed on the same column. The column line CL may transfer the pixel signal output from a corresponding pixel PX to the ADC circuitry 130.

The timing controller 120 may control operation timings of the ADC circuitry 130 and the image signal processing circuitry 140 by transferring control signals instructing the operation timings to the ADC circuitry 130 and the image signal processing circuitry 140, respectively. In some embodiments, the timing controller 120 may control the ADC circuitry 130 and the image signal processing circuitry 140 to process the image in row units in synchronization with a horizontal synchronization signal (or a line synchronization signal). One cycle of the horizontal sync signal may be called "one horizontal cycle". In some embodiments, an image of a row unit may be an image corresponding to pixels of one row (or one line) in the image sensor 100.

The ADC circuitry 130 may perform analog-to-digital conversion processing (hereinafter referred to as "ADC processing") on the pixel signals generated by the pixels PX in response to the control signal from the timing controller 120, thereby converting the pixel signals into digital image data. The image data may include a pixel value of each pixel PX. The ADC circuitry 130 may transfer the image data to the image signal processing circuitry 140 in response to the control signal from the timing controller 120.

The image signal processing circuitry 140 may perform digital processing (e.g., image signal processing) on the image data received from the ADC circuitry 130. In some embodiments, the image signal processing circuitry 140 may include a line memory 141 and an image signal processor (ISP) 142. The line memory 141 may store the image data received from the ADC circuitry 130 and read the stored image data in response to the control signal from the timing controller 120. The ISP 142 may perform the digital processing on the image data read in the line memory 141.

In some embodiments, the line memory 141 may include a memory controller 141a and a memory 141b. The memory controller 141a may control read and write of the memory 141b. The memory controller 141a may write the image data received from the ADC circuitry 130 in the memory 141b, or read the image data from the memory 141b and output the image data to the ISP 142. The memory controller 141a may operate as a spreader unit. In some embodiments, a separate memory 142a may be connected to the ISP 142. The memory 142a may temporarily store data used for the digital processing of the ISP 142. Each of the memories 141b and 142a may be implemented with, for example, static random-access memory (SRAM).

Referring to FIG. 1 and FIG. 2, the ADC circuitry 130 may perform the ADC processing, which is analog processing of converting the pixel signals (e.g., the pixel signals of a row unit) into the image data, during predetermined periods (or ADC processing periods) 210 and 220 of one horizontal cycle. The ADC circuitry 130 may sequentially perform the ADC processing 210 and 220 more than once during one horizontal period. Although FIG. 2 shows an example in which the ADC processing 210 and 220 are performed twice, the number of times of the ADC processing during one horizontal period is not limited thereto. In some embodiments, the ADC processing 210 and 220 may include ADC processing 210 of processing a reset signal of the pixel signal and ADC processing 220 of converting a pixel value of the pixel signal. In some embodiments, the ADC processing 210 and 220 performed during one horizontal period may further include ADC processing for converting the pixel signal into image data to perform multiple sampling operations for generating autofocusing information or multiple gain samplings for high dynamic range (HDR). The ISP 142 may perform the digital processing on the image data stored in the line memory 141 during one horizontal period. For example, the ISP 142 may process the image data of one row as a unit of a predetermined size. A digital processing period during which the ISP 142 performs the digital processing may be shorter than one horizontal period.

During the digital processing period 230, power consumption may not be constant, so ground coupling may occur. The ground coupling noise may affect the performance of the ADC circuitry 130. Particularly, partial periods 211 and 221 of the ADC processing period 210 and 220 may be affected by the digital processing of the ISP 142. Such periods 211 and 221 may be referred to as "critical periods". In some embodiments, the critical periods 211 and 221 may include a period in which the ADC circuitry 130 detects a pixel signal having a relatively low digital code value (e.g., a pixel signal whose digital code value is lower than a threshold). The digital code value may be called a "grayscale value." Such a period may be referred to as a "low code decision period". In some embodiments, the low code decision period may be a period for determining least significant bits (LSBs) with a predetermined number or less in the digital code. For example, when a 12-bit digital code is used, the low code decision period may be a period in which 8 or less LSBs of the digital code are determined.

In the critical period 211 and 221, when the ISP 142 performs the digital processing, the digital processing of the ISP 142 may affect the ADC processing of the ADC circuitry 130. Therefore, as shown in FIG. 2, the timing controller 120 may control the image signal processing circuitry 140 to restart the digital processing after the ISP 142 holds the digital processing during predetermined periods (or holding periods) 241 and 242. The timing controller 120 may control the image signal processing circuitry 140 so that the holding periods 241 and 242 are synchronized with the critical periods 211 and 221, respectively. In some embodiments, the holding periods 241 and 242 may be set such that power 250 consumed in the image signal processing circuitry 140 during the critical periods 211 and 221 becomes lower than a threshold 251. In some embodiments, the holding periods 241 and 242 may be set so that a fluctuation value of the power 250 consumed in the image signal processing circuitry 140 during the critical periods 211 and 221 becomes lower than a threshold. For example, due to parasitic components of circuits in the image sensor 100, the power 250 may not decrease to the threshold 251 at a time point when the digital processing of the image signal processing circuitry 140 is held. Accordingly, the holding periods 241 and 242 may be set by considering delay due to parasitic components. In some embodiments, start times of the holding periods 241 and 242 may be set to precede start times of the critical periods 211 and 221 by a predetermined time. In some embodiments, since the critical periods 211 and 221 start at predetermined time points of the ADC processing periods 210 and 220, the start times of the holding periods 241 and 242 may be set based on the start times of the ADC processing period 210 and 220.

Then, as the ISP 142 holds the digital processing during the holding periods 241 and 242, little power can be consumed in the image signal processing circuitry 140 during the critical periods 211 and 221, or the fluctuation in power consumption can be minimized. Accordingly, it is possible to remove the influence of the ADC processing during the critical periods 211 and 221 that may be affected by the digital processing.

FIG. 3A and FIG. 3B show digital code distribution in a case of capturing a dark image in which digital code values of all pixels are, for example, 64. In FIG. 3A and FIG. 3B, an x-axis and a y-axis represent rows and columns in the pixel array 110, respectively, and a z-axis represents digital code values. As shown in FIG. 3A, it can be seen that the ADC processing is affected by the digital processing and the digital code values are not uniformly distributed when the digital processing of the ISP 142 is not held. However, as shown in FIG. 3B, it can be seen that the digital code values are uniformly distributed when the digital processing of the ISP 142 is held during the holding periods 241 and 242.

Figure 4:
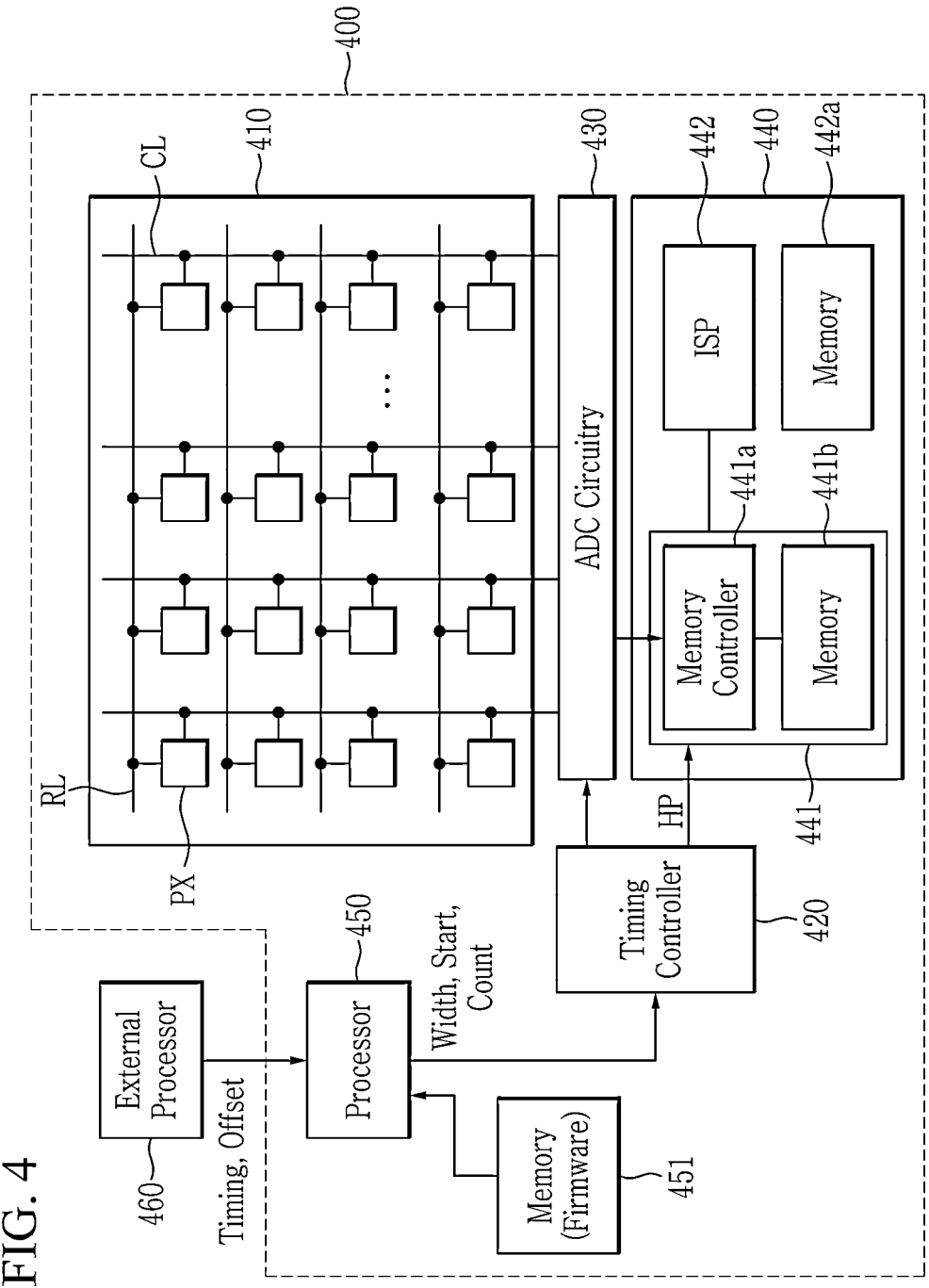
FIG. 4 is an example block diagram of an image sensor according to an embodiment.
Figure 5:
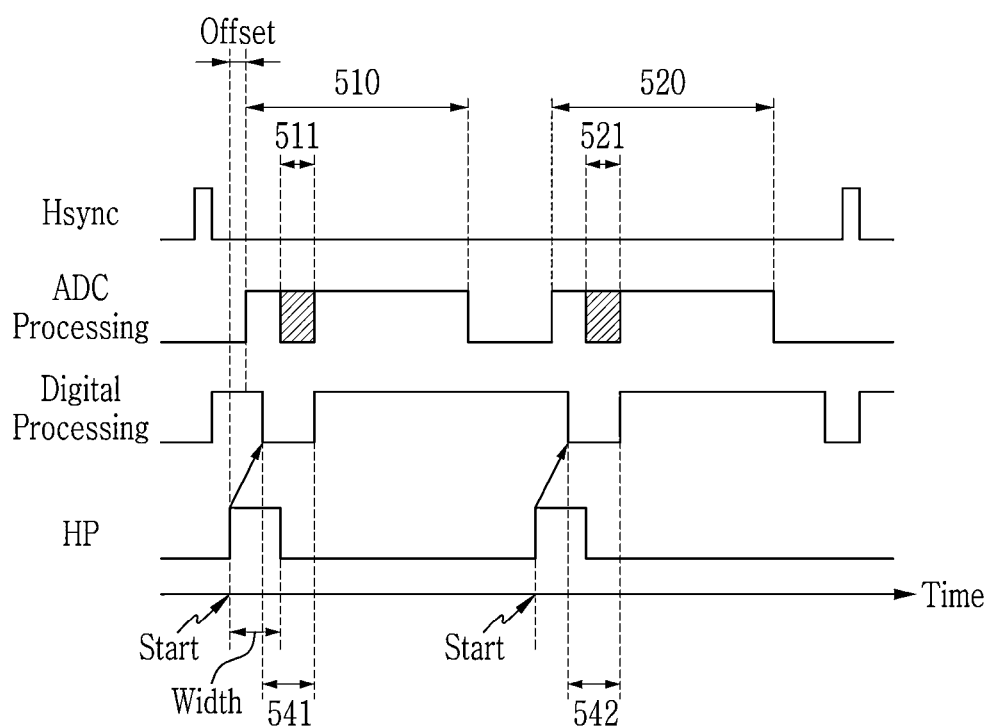
FIG. 5 is an example drawing showing an operation timing of an image sensor according to an embodiment.

FIG. 4 is an example block diagram of an image sensor according to an embodiment, and FIG. 5 is an example drawing showing an operation timing of an image sensor according to an embodiment.

Referring to FIG. 4, as described with reference to FIG. 1, an image sensor 400 may include a pixel array 410, a timing controller 420, an ADC circuitry 430, and an image signal processing circuitry 440, and the image signal processing circuitry 440 may include a line memory 441 and an ISP 442. In some embodiments, the line memory 441 may include a memory controller 441a and a memory 441b, a memory 442a may be connected to the ISP 442.

Referring to FIG. 4 and FIG. 5, the timing controller 420 may control the line memory 441 to set holding periods 541 and 542 for holding digital processing of the ISP 442. In some embodiments, the timing controller 420 may transfer a hold processing signal HP to the line memory 441 to set the holding periods 541 and 542 of holding the digital processing of the ISP 442. The hold processing signal HP may be a signal having pulses (hereinafter referred to as "hold pulses") of a predetermined level (or enable level) during the holding periods 541 and 542. The line memory 441 may stop a read operation in response to the hold pulses (or the enable level) of the hold processing signal HP. Since there is no image data to be read and output from line memory 441, the ISP 442 may hold (or stop) the digital processing during the holding period 541 and 542. As the ISP 442 holds the digital processing during the holding periods 541 and 542, little power can be consumed in the image signal processing circuitry 440 during the critical periods 511 and 521.

In some embodiments, even if there is no image data output from the line memory 441, the ISP 442 may perform the digital processing with temporarily stored data (e.g., data stored in the memory 442a). Accordingly, a point in time at which the ISP 442 holds the digital processing may appear delayed from the start time of the hold pulse. Accordingly, the timing controller 420 may generate the hold pulses based on this delay time.

Referring to FIG. 4 again, in some embodiments, the image sensor 400 may further include a processor 450. The processor 450 may include logic that performs an arithmetic operation. The processor 450 may provide predetermined information of the holding periods 541 and 542 (or the hold pulses) to the timing controller 420, and the timing controller 420 may generate the hold processing signal HP based on the predetermined information. In some embodiments, the predetermined information of the holding periods 541 and 542 may include a hold width and a hold start time. In some embodiments, the predetermined information of the holding periods 541 and 542 may further include the number (or count) of hold pulses. Then, the timing controller 420 may transfer to the line memory 441 the hold processing signal HP that has the hold pulses of the predetermined level from the hold start time during the hold width.

In some embodiments, the processor 450 may determine the hold width based on a difference between a time of one horizontal period and a time of the digital processing period (i.e., a time required for the digital processing), and the number of times of the ADC processing 510 and 520 (two in the example shown in FIG. 5). For example, the processor 450 may determine a value obtained by dividing the difference between the time of the one horizontal period and the time of the digital processing period by the number of times of the ADC processing 510 and 520 as the hold width as in Equation 1.

$$\text{Hold width} = \frac{1H \text{ time} - \text{Digital processing period}}{\text{Num of ADC processing}} \quad \text{Equation 1}$$

In some embodiments, the processor 450 may determine the hold start time based on an offset indicating a difference between the start time of the ADC processing 510 and 520 and the hold start time. For example, as in Equation 2, the processor 450 may determine a point of time obtained by subtracting an offset from the start time of each ADC processing 510 and 520 as the hold start time of each hold pulse.

$$\text{Hold start}[n]=\text{Analog processing start}[n]-\text{offset} \quad \text{Equation 2}$$

In some embodiments, an algorithm for determining the predetermined information of the hold pulses (e.g., Equations 1 and 2) may be stored in a memory 451 used by the processor 450. The memory 451 may be, for example, a read-only memory (ROM). The algorithm may be stored as firmware in the memory 451.

In some embodiments, the processor 450 may receive the start times of and of the ADC processing 510 and 520 and the offset from an external processor 460 (e.g., a processor of a computing device to which the image sensor 400 is connected). The image sensor 400 and the external processor 460 may form an imaging system. In some embodiments, the processor 450 may store the offset in a register or a memory. In some embodiments, the processor 450 may set the offset based on an input from the outside.

Figure 6:
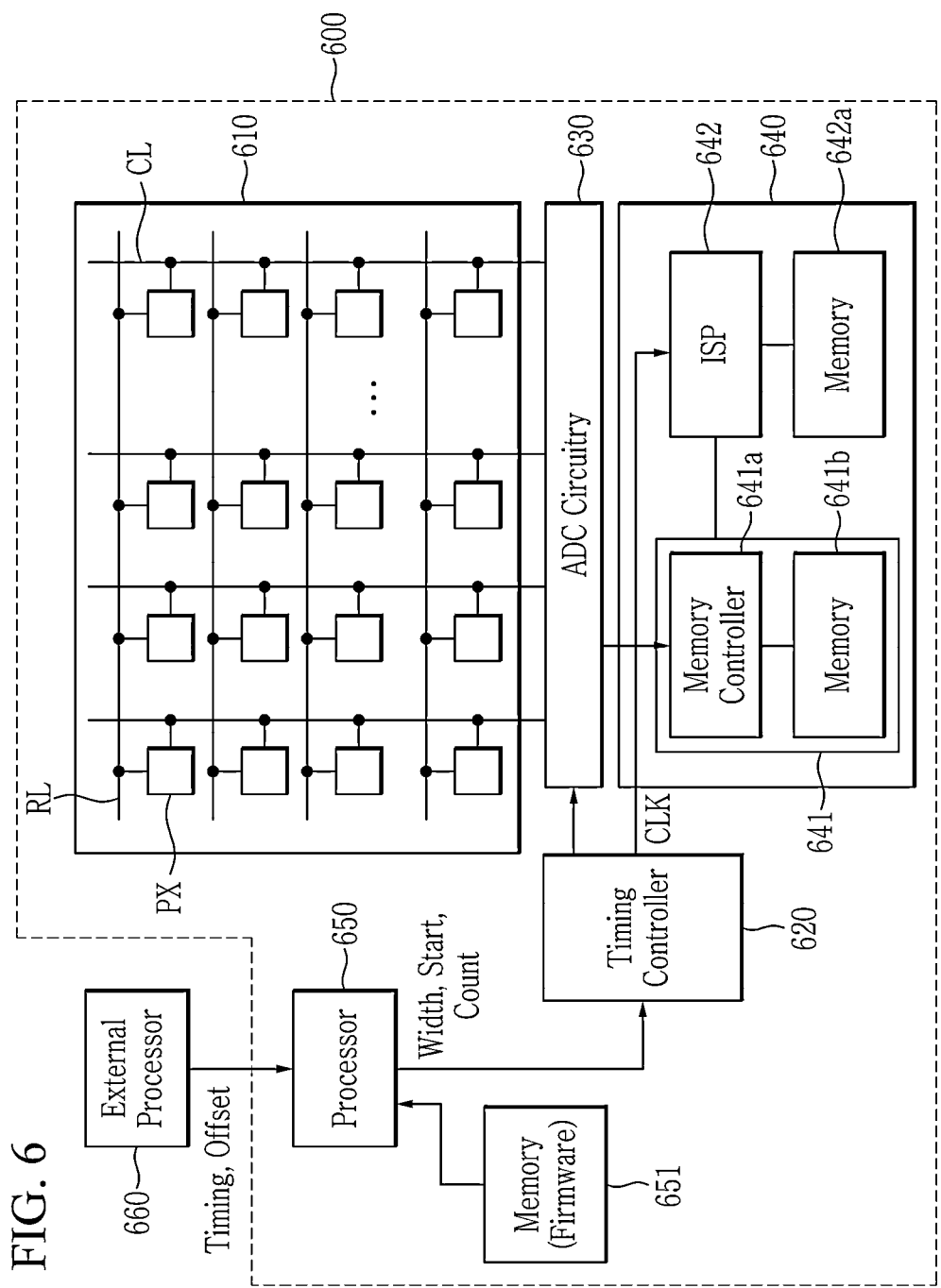
FIG. 6 is an example block diagram of an image sensor according to an embodiment.
Figure 7:
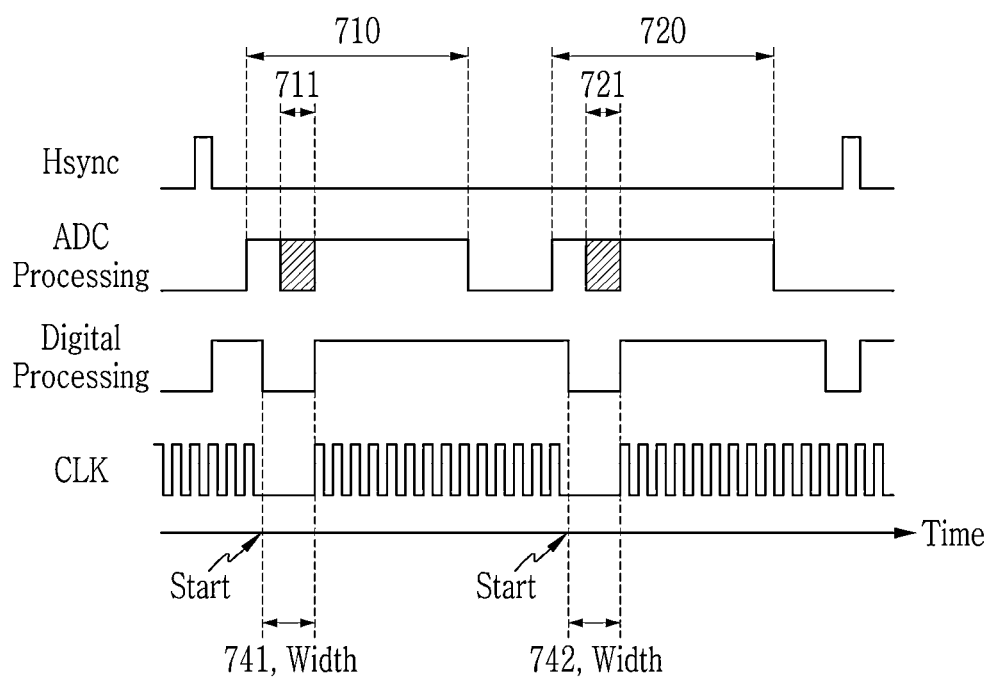
FIG. 7 is an example drawing showing an operation timing of an image sensor according to an embodiment.

FIG. 6 is an example block diagram of an image sensor according to an embodiment, and FIG. 7 is an example drawing showing an operation timing of an image sensor according to an embodiment.

Referring to FIG. 6, as described with reference to FIG. 4, an image sensor 600 may include a pixel array 610, a timing controller 620, an ADC circuitry 630, and an image signal processing circuitry 640, and the image signal processing circuitry 640 may include a line memory 641 and an ISP 642. In some embodiments, line memory 641 may include a memory controller 641a and a memory 641b, a memory 642a may be connected to the ISP 642.

Referring to FIG. 6 and FIG. 7, the timing controller 620 may control the ISP 642 to set holding periods 741 and 742 of holding digital processing of the ISP 642. In some embodiments, the timing controller 620 may set the holding periods 741 and 742 by blocking a clock CLK to be transferred to the ISP 642 during the holding periods 741 and 742. Since the ISP 642 operates according to the clock CLK, the ISP 642 may hold (or stop) the digital processing during the holding periods 741 and 742 when the clock CLK is blocked. As the ISP 642 holds the digital processing during the holding periods 741 and 742, little power can be consumed in the image signal processing circuitry 640 during critical periods 711 and 721 of ADC processing 710 and 720.

In some embodiments, the timing controller 620 may block the clock CLK based on predetermined information of the holding periods 741 and 742 transferred from a processor 650. In some embodiments, the processor 650 may receive start times of the ADC processing 710 and 720 and an offset from an external processor 660, and determine the predetermined information based on the start times and the offset. In some embodiments, an algorithm (e.g., a calculation formula) for determining the predetermined information of the holding period 741 and 742 may be stored as firmware in a memory 651 used by the processor 650. In some embodiments, the predetermined information of the holding periods 741 and 742 may include a width and start times. In some embodiments, the predetermined information of the holding periods 741 and 742 may further include the number (or count) of holding periods 741 and 742. The timing controller 620 may block the clock CLK during the width at each of the start times. Since the ISP 642 stops operating when the clock CLK is blocked, in some embodiments, the start times of blocking the clock CLK may be set to be substantially equal to the start times of the holding periods 741 and 742.

Figure 8:
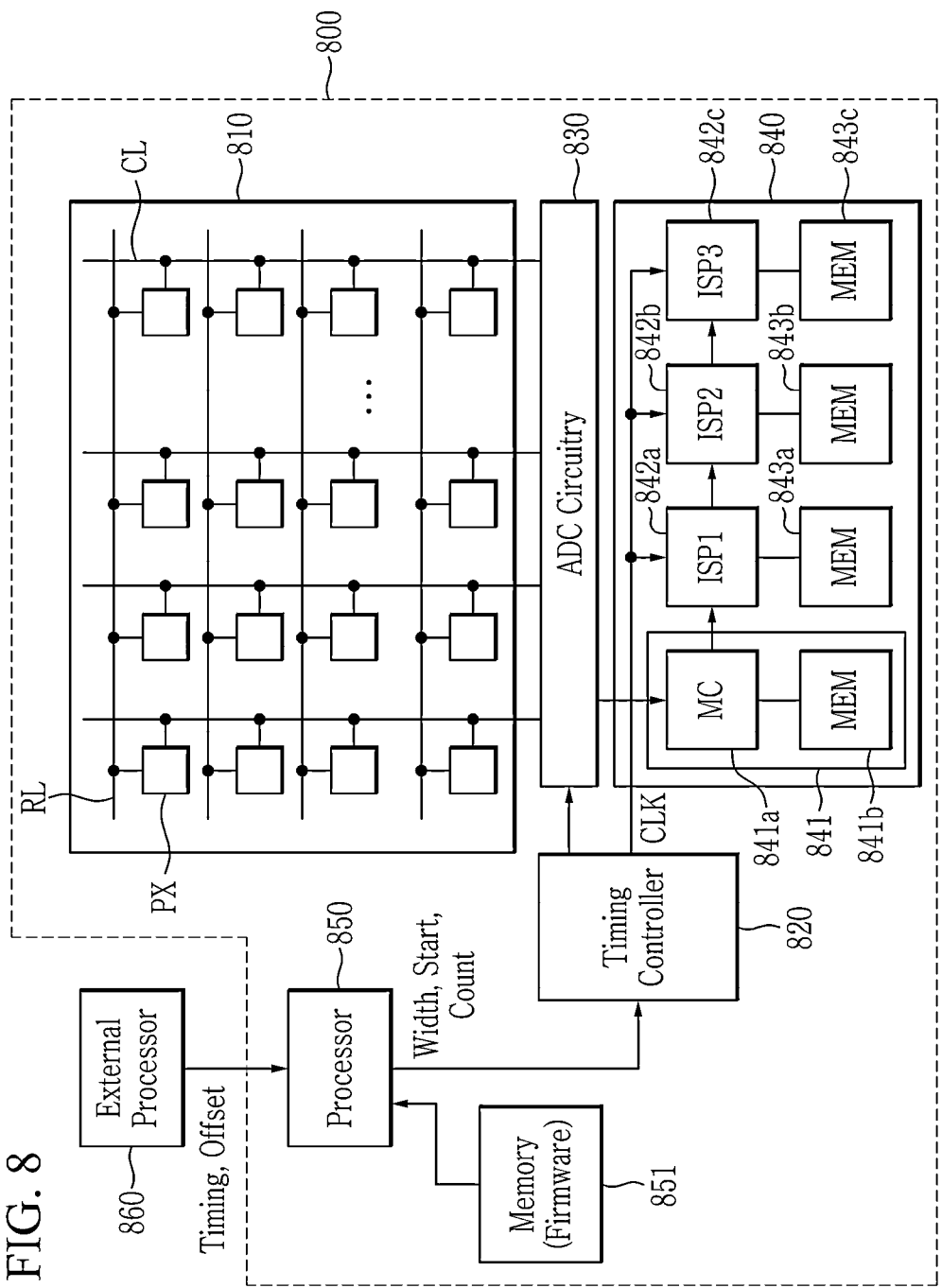
FIG. 8 is an example block diagram of an image sensor according to an embodiment.
Figure 9:
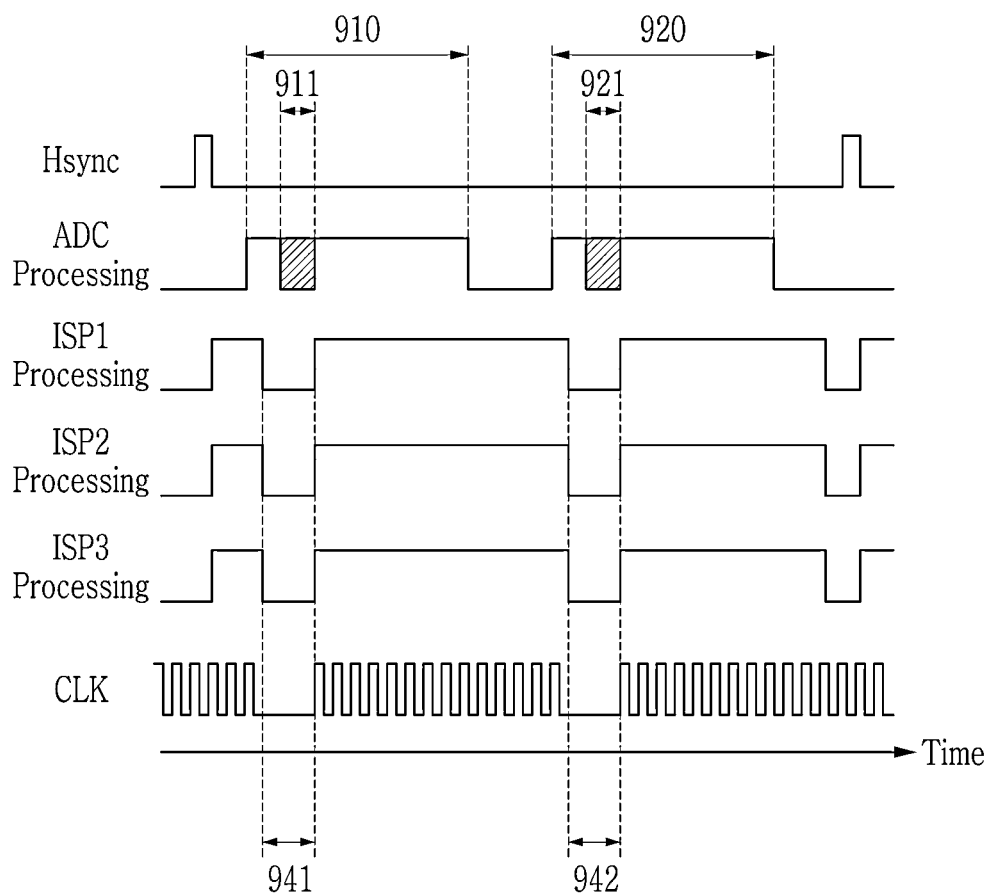
FIG. 9 is an example diagram showing an operation timing diagram of an image sensor according to an embodiment.

FIG. 8 is an example block diagram of an image sensor according to an embodiment, and FIG. 9 is an example diagram showing an operation timing diagram of an image sensor according to an embodiment.

Referring to FIG. 8, as described with reference to FIG. 4, an image sensor 800 may include a pixel array 810, a timing controller 820, an ADC circuitry 830, and image signal processing circuitry 840. The image signal processing circuitry 840 may include a line memory 841 and a plurality of ISP blocks 842a, 842b, and 842c. The plurality of ISP blocks 842a, 842b, and 842c may be denoted as "ISP1", "ISP2" and "ISP3", respectively. In some embodiments, the line memory 841 may include a memory controller 841a and a memory 841b, and memories 843a, 843b, and 843c that may be connected to the ISP blocks 842a, 842b, and 842c, respectively. Although three ISP blocks 842a, 842b, and 842c are shown in FIG. 8, the number of ISP blocks 842a, 842b, and 842c is not limited thereto. In some embodiments, the ISP blocks 842a, 842b, and 842c may be blocks that are logically or physically divided according to image signal processing functions. For example, the image signal processing functions may include bad pixel correction, noise removal, color correction, image quality compensation, pixel binning, or data alignment.

The ISP blocks 842a, 842b, and 842c may sequentially perform image signal processing on image data. The line memory 841 may store image data transferred from the ADC circuitry 830, and the ISP block 842a may perform the image signal processing on the image data read in the line memory 841. The ISP block 842b may perform image signal processing on the image data processed and transferred by the ISP block 842a, and the ISP block 842c may perform image signal processing on the image data processed and transferred by the ISP block 842b.

Referring to FIG. 8 and FIG. 9, the timing controller 820 may control the ISP blocks 842a, 842b, and 842c to set holding periods 941 and 942 of holding the digital processing of the ISP blocks 842a, 842b, and 842c. In some embodiments, the timing controller 820 may set the holding periods 941 and 942 by blocking a clock CLK to be transferred to the ISP blocks 842a, 842b, and 842c during the holding periods 941 and 942. As the ISP blocks 842a, 842b, and 842c hold the digital processing during the holding periods 941 and 942, little power can be consumed in the image signal processing circuitry 840 during critical periods 911 and 921 of ADC processing 910 and 920.

In some embodiments, as described with reference to FIG. 6 and FIG. 7, the timing controller 820 may block the clock CLK based on predetermined information of the holding periods 941 and 942 transferred from a processor 850. In some embodiments, the processor 850 may receive start times of the ADC processing 910 and 920 and an offset from an external processor 960, and determine the predetermined information based on the start times and the offset. In some embodiments, an algorithm (e.g., a calculation formula) for determining the predetermined information of the holding periods 941 and 942 may be stored as firmware in a memory 851 used by the processor 850.

Figure 10:
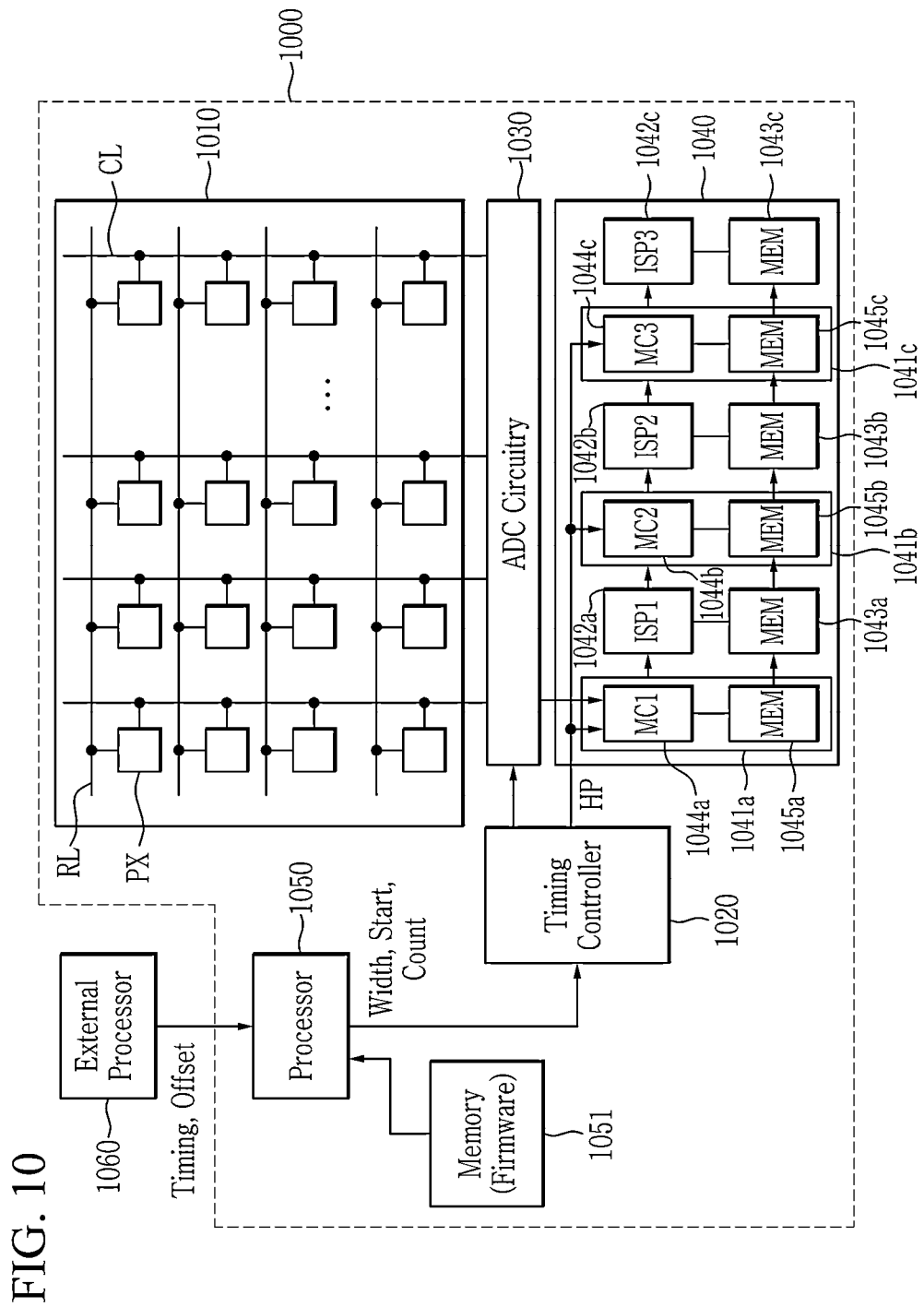
FIG. 10 is an example block diagram of an image sensor according to an embodiment.
Figure 11:
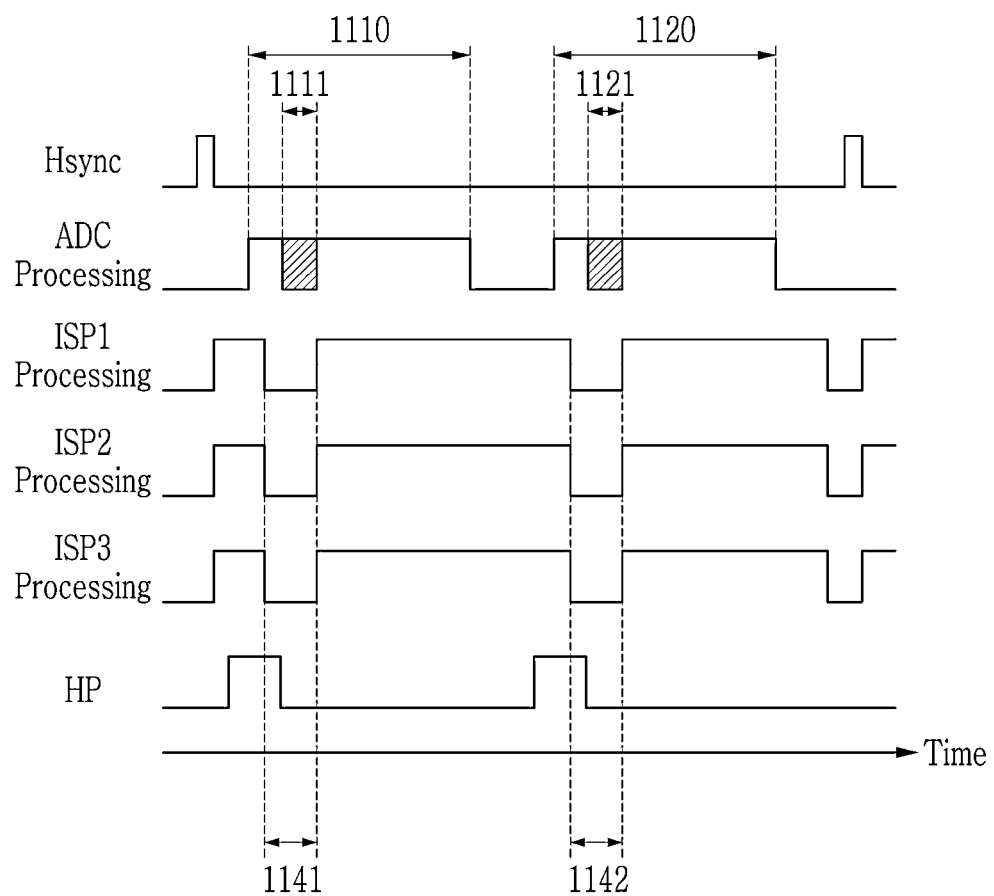
FIG. 11 is an example diagram showing an operation timing of an image sensor according to an embodiment.

FIG. 10 is an example block diagram of an image sensor according to an embodiment, and FIG. 11 is an example diagram showing an operation timing of an image sensor according to an embodiment.

Referring to FIG. 10, as described with reference to FIG. 4, an image sensor 1000 may include a pixel array 1010, a timing controller 1020, an ADC circuitry 1030, and an image signal processing circuitry 1040. The image signal processing circuitry 1040 may include a plurality of line memories 1041a, 1041b, and 1041c and a plurality of ISP blocks 1042a, 1042b, and 1042c. The plurality of ISP blocks 1042a, 1042b, and 1042c may be denoted as "ISP1", "ISP2", and "ISP3", respectively. The plurality of line memories 1041a, 1041b, and 1041c may correspond to the plurality of ISP blocks 1042a, 1042b, and 1042c, respectively. In some embodiments, the line memories 1041a, 1041b, and 1041c may include a memory controller 1044a, 1044b, and 1044c, and memories 1045a, 1045b, and 1045c, respectively. Memories 1043a, 1043b, and 1043c may be connected to the ISP blocks 1042a, 1042b, and 1042c, respectively. Although three line memories 1041a, 1041b, and 1041c, and three ISP blocks 1042a, 1042b, and 1042c are shown in FIG. 10, the number of line memories 1041a, 1041b, and 1041c, and the number of ISP blocks 1042a, 1042b, and 1042c are not limited thereto.

The ISP blocks 1042a, 1042b, and 1042c may sequentially perform image signal processing on image data. Each of the line memories 1041a, 1041b, and 1041c may store data on which the digital processing is to be performed by a corresponding one of the ISP blocks 1042a, 1042b, and 1042c. The line memory 1041a may store image data transferred from the ADC circuitry 1030, and the ISP block 1042a may perform the image signal processing on the image data read in the line memory 1041a. The line memory 1041b may store the image data processed and transferred by the ISP block 1042a, and the ISP block 1042b may perform the image signal processing on the image data read in the line memory 1041b. The line memory 1041c may store the image data processed and transferred by the ISP block 1042b, and the ISP block 1042c may perform the image signal processing on the image data read in the line memory 1041c.

As an image signal processing algorithm in the ISP becomes more complex, processing latency in each ISP block may increase. In some embodiments, when the ISP blocks 842a, 842b, and 842c share the line memory 841, the timing controller 820 may transfer a hold processing signal to the line memory 841 to set holding periods as shown in FIG. 8. In this case, the holding period of the ISP block 842a positioned at the front stage can be controlled at a desired timing. However, the holding periods of the ISP blocks 842b and 842c positioned relatively later may not be controlled at desired timings due to the processing latency of each ISP block. Accordingly, the holding period may be delayed from the desired timing, so that power consumed in the image signal processing circuitry 840 in a critical period may not fall below a threshold.

In some embodiments, as shown in FIG. 10, by providing the plurality of line memories 1041a, 1041b, and 1041c respectively corresponding to the plurality of ISP blocks 1042a, 1042b, and 1042c, the holding periods of the ISP blocks 1042a, 1042b, and 1042c can be controlled at the desired timings. In this case, the timing controller 1020 may control the line memories 1041a, 1041b, and 1041c respectively corresponding to the ISP blocks 1042a, 1042b, and 1042c. Referring to FIG. 10 and FIG. 11, the timing controller 1020 may transfer the hold processing signal HP to the line memories 1041a, 1041b, and 1041c to set the holding periods 1141 and 1142. The timing controller 1020 may provide the hold processing signals HP to the line memories 1041a, 1041b, and 1041c in parallel (or simultaneously). The line memories 1041a, 1041b, and 1041c may stop read operations at substantially the same timing in response to hold pulses of the hold processing signals HP. Accordingly, the holding periods 1141 and 1142 of the ISP blocks 1042a, 1042b, and 1042c can be synchronized to prevent the delays of the holding periods 1141 and 1142 caused by the processing latency of each ISP block.

In some embodiments, as shown in FIG. 9, the timing controller 1020 may control the holding periods 1141 and 1142 at substantially the same timing by blocking a clock CLK to be transferred to the ISP blocks 1042a, 1042b, 1042c. As the clock CLK is blocked, the ISP blocks 1042a, 1042b, and 1042c may hold the digital processing during the holding periods 1141 and 1142. Accordingly, little power can be consumed in the image signal processing circuitry 1040 during critical periods 1111 and 1112 of ADC processing 1110 and 1120.

In some embodiments, as described with reference to FIG. 4 and FIG. 5, the timing controller 1020 may generate the hold processing signal HP based on predetermined information of the holding periods 1041 and 1042 transferred from a processor 1050. In some embodiments, the processor 1050 may receive start times of the ADC processing 1010 and 1020 and an offset from an external processor 1060, and determine the predetermined information based on the start times and the offset. In some embodiments, an algorithm (e.g., a calculation formula) for determining the predetermined information of the holding period 1041 and 1042 may be stored as firmware in a memory 1051 used by the processor 1050.

Figure 12:
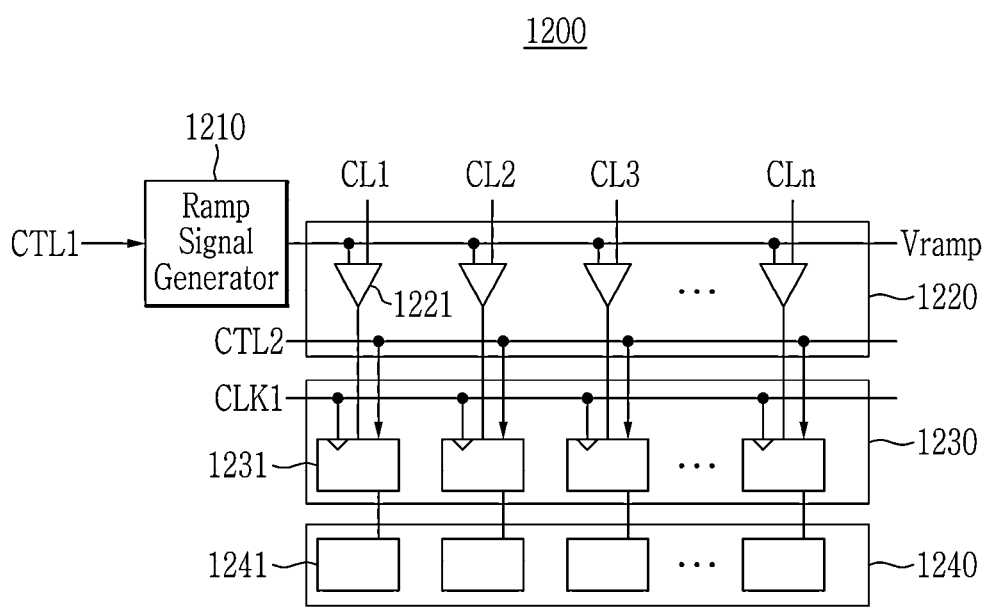
FIG. 12 is an example drawing showing an ADC circuitry of an image sensor according to an embodiment.
Figure 13:
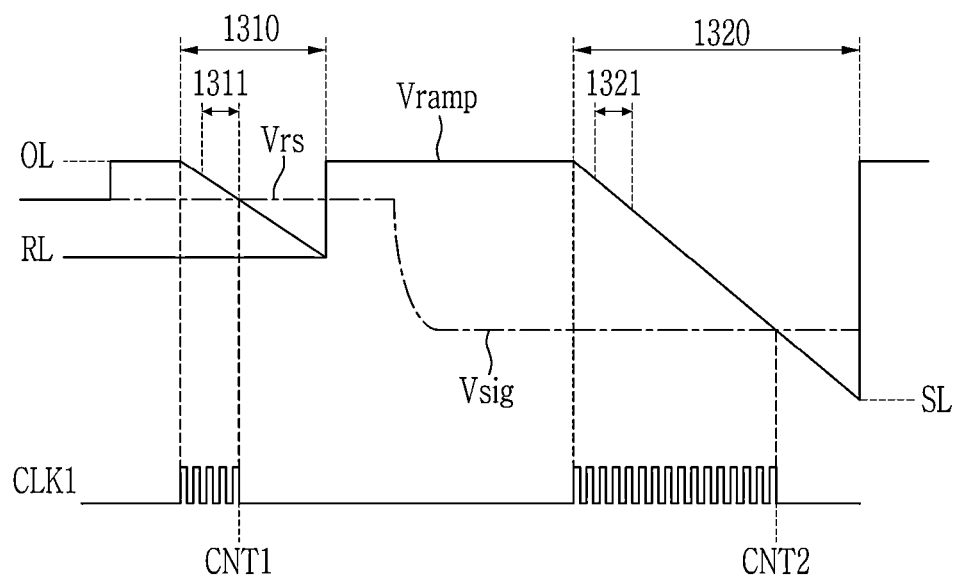
FIG. 13 is an example drawing showing an analog-to-digital conversion operation of an image sensor according to an embodiment.

FIG. 12 is an example drawing showing an ADC circuitry of an image sensor according to an embodiment, and FIG. 13 is an example drawing showing an analog-to-digital conversion operation of an image sensor according to an embodiment.

Referring to FIG. 12, an ADC circuitry 1200 may include a comparison circuit 1220, a counter circuit 1230, and a line buffer 1240, and an image sensor may further include a ramp signal generator 1210.

The ramp signal generator 1210 may generate a ramp signal Vramp that gradually increases or decreases with time in response to a control signal CTL1 from a timing controller (e.g., 120 in FIG. 1), and transfer the ramp signal Vramp to the comparison circuit 1220.

The comparison circuit 1220 may include a plurality of comparators 1221 that correspond to a plurality of column lines CL1, CL2, CL3 . . . CLn of a pixel array, respectively. Each comparator 1221 may compare a pixel signal transferred through a corresponding column line CLi with the ramp signal Vramp, and output a comparison signal whose level is changed when the ramp signal Vramp becomes equal to the pixel signal. Here, i is an integer between 1 and n. The level change timing of each comparison signal may be determined depending on a level of the pixel signal transferred from the corresponding column line CLi.

The counter circuit 1230 may include a plurality of counters 1231 that correspond to the plurality of comparators 1221 or the plurality of column lines CL1 to CLn, respectively. Each counter 1231 may start counting in response to a control signal CTL2 from the timing controller, count the level change timing of the comparison signal output from the comparator 1221 based on a clock CLK1, and output a count value. In some embodiments, the timing controller may output the clock CLK1. In some embodiments, the ADC circuitry 1200 may further include a clock generator that generates the clock CLK1 in response to a control signal from the timing controller.

The line buffer 1240 may store count values output from the counter circuit 1230 as pixel values. The line buffer 1240 may include a plurality of memories 1241 that correspond to the plurality of counters 1231 (or a plurality of column lines CL1 to CLn), respectively. Each memory 1241 may store the count value output from a corresponding counter 1231 as a pixel value of a corresponding pixel.

Referring to FIG. 12 and FIG. 13, one horizontal period may include a plurality of ADC processing periods 1310 and 1320.

In the first ADC processing period 1310, the ramp signal generator 1210 may gradually change a voltage of the ramp signal Vramp from an offset level OL to a reset minimum level RL. The reset minimum level RL may be a level at which a maximum digital code (or a minimum voltage) of the reset signal is detected. FIG. 13 shows an example in which the voltage of the ramp signal Vramp gradually decreases to the reset minimum level RL. Such a ramp signal Vramp is called a down ramp signal. During the first ADC processing period 1310, reset signals Vrs may be transferred through the column lines CL1 to CLn. Each comparator 1221 may change a level of a comparison signal when a level of the reset signal Vrs transferred from the corresponding column line CLi becomes equal to a level of the ramp signal Vramp. Each counter 1231 may start counting based on the clock CLK1 signal from a time when the ramp signal Vramp starts to decrease, and store a count value CNT1 output from the corresponding comparator 1221 when the level of the comparison signal is changed. That is, each counter 1231 may count until the level of the reset signal Vrs transferred from the corresponding column line becomes equal to the level of the ramp signal Vramp, and store the count value CNT1. In some embodiments, a low code decision period in which the reset signal is detected between a first level and a second level of the ramp signal Vramp may correspond to the critical period 1311. The first level may be, for example, a level at which the reset signal having the minimum digital code is detected, and the second level may be, for example, a level at which the reset signal having a level corresponding to a threshold is detected. In some embodiments, the low code decision period may be a period for deciding a digital code corresponding to LSBs of a predetermined number (e.g., 8) or less, and the threshold may be a digital code value (grayscale value) of 256.

The ramp signal generator 1210 may maintain the level of the ramp signal Vramp to a predetermined level (e.g., the offset level OL) again. During this period, each pixel of the pixel array may output a pixel signal Vsig.

Next, in the second ADC processing period 1320, the ramp signal generator 1210 may gradually change the voltage of the ramp signal Vramp from the offset level OL to a signal minimum level SL. The signal minimum level SL may be a level at which a maximum digital code (or a minimum voltage) of the pixel signal is detected. FIG. 13 shows an example in which the voltage of the ramp signal Vramp gradually decreases to the signal minimum level SL. During the second ADC processing period 1320, pixel signals Vsig may be transferred through the column lines CL1 to CLn. Each comparator 1221 may change the level of the comparison signal when the level of the pixel signal Vsig transferred from the corresponding column line becomes equal to the level of the ramp signal Vramp. Each counter 1231 may start counting based on the clock CLK1 signal from a time when the ramp signal Vramp starts to decrease, and store a count value CNT2 from the corresponding comparator 1221 when the level of the comparison signal is changed. That is, each counter 1231 may count until the level of the pixel signal Vsig transferred from the corresponding column line becomes equal to the level of the ramp signal Vramp, and store the count value CNT2. Next, each counter 1231 may transfer a final count value in which a component of the reset signal is removed from the pixel signal based on the count values CNT1 and CNT2 to the memory 1241 as a pixel value. In some embodiments, a period in which the pixel signal is detected between a third level and a fourth level of the ramp signal Vramp may correspond to the critical period 1312. The third level may be, for example, a level at which the pixel signal having a minimum digital code is detected, and the fourth level may be, for example, a level at which the pixel signal of a level corresponding to a threshold is detected. In some embodiments, the low code decision period may be a period for deciding a digital code corresponding to LSBs of a predetermined number (e.g., 8) or less, and the threshold may be a digital code value (grayscale value) of 256.

Figure 14:
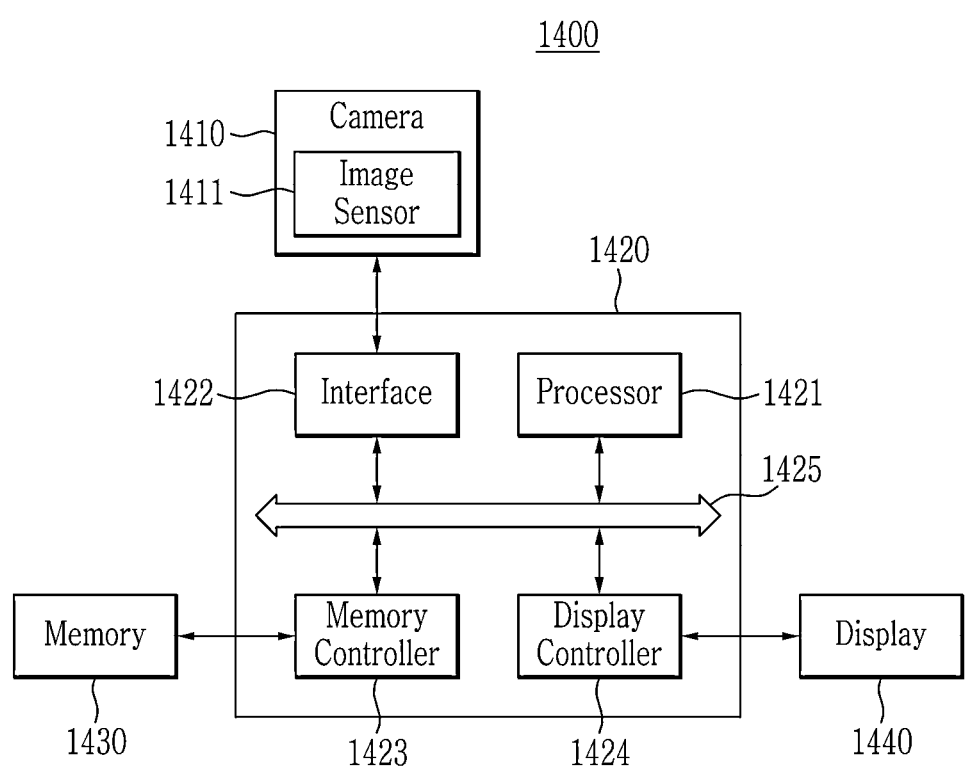
FIG. 14 is an example block diagram showing a computer device according to an embodiment.

FIG. 14 is an example block diagram showing a computer device according to an embodiment.

Referring to FIG. 14, a computing device 1400 may include a camera 1410, a controller 1420, a memory 1430 and a display 1440. The computing device 1400 may be referred to as an imaging system.

The camera 1410 may include an image sensor 1411. The image sensor 1411 may be implemented as the image sensor described with reference to FIG. 1 to FIG. 13. The camera 1410 may generate image data using the image sensor 1411, perform image signal processing on the image data, and output the processed image data to the controller 1420.

The controller 1420 may include a processor 1421. The processor 1421 may control an overall operation of each component of the computing device 1400. The controller 1420 or the processor 1421 may be implemented with at least one of various processing units such as a central processing unit (CPU), an application processor (AP), and a graphic processing unit (GPU). In some embodiments, the controller 1420 may be implemented as an integrated circuit or system on chip (SoC). The controller 1420 or the processor 1421 may provide the image sensor 1410 with information (e.g., a width and start times) for determining predetermined information of holdings period of the image sensor 1410.

In some embodiments, as shown in FIG. 14, the controller 1420 may further include an interface 1422, a memory controller 1423, a display controller 1424, and a bus 1425. In some embodiments, at least part of the interface 1422, the memory controller 1423, the display controller 1424, and the bus 1425 may be provided external to the controller 1420. In some embodiments, the controller 1420 may further include an image signal processor.

The interface 1422 may transfer the image data received from the image sensor 1411 to the memory controller 1423 or the display controller 1424 through the bus 1425.

The memory 1430 may store various data and instructions. The memory controller 1423 may control transfers of the data or instructions to and from the memory 1430.

The display controller 1424 may transfer data to be displayed on the display 1440 to the display 1440 under a control of the processor 1421, and the display 1440 may display a screen according to the received data. In some embodiments, the display 1440 may further include a touch screen. The touch screen may transfer a user input for controlling an operation of the computing device 1400 to the controller 1420. The user input may be generated when a user touches the touch screen.

The bus 1425 may provide a communication function between the components of the controller 1420. The bus 1425 may include at least one type of bus according to a communication protocol between the components.

While this invention has been described in connection with what is presently considered to be preferred embodiments, it is to be understood that the invention is not limited to the disclosed embodiments. On the contrary, it is intended to cover various modifications and equivalent arrangements included within the spirit and scope of the appended claims.

What is claimed is:

1. An image sensor comprising:
    a pixel array;
    an analog-to-digital conversion (ADC) circuitry configured to generate image data by sequentially performing ADC processing twice or more on a pixel signal transferred from the pixel array in an operation period of one horizontal cycle;
    an image signal processing circuitry configured to receive the image data and perform digital processing on the image data; and
    a timing controller configured to control the image signal processing circuitry to hold the digital processing during a plurality of holding periods that respectively correspond to portions of two or more ADC processing periods in each of which the ADC processing is performed,
    wherein each of the portions is a period in which a digital code corresponding to least significant bits of a predetermined number or less is decided from the pixel signal by the ADC processing.

2. The image sensor of claim 1, wherein the timing controller is configured to transfer to the image signal processing circuitry a hold processing signal having a plurality of pulses that correspond to the plurality of holding periods, respectively, and
    wherein the image signal processing circuitry is configured to hold the digital processing in response to each of the plurality of pulses.

3. The image sensor of claim 2, wherein the image signal processing circuitry comprises:
    an image signal processor configured to perform the digital processing; and
    a line memory configured to store the image data, and read the image data and transfer the image data to the image signal processor,
    wherein the timing controller is configured to transfer the hold processing signal to the line memory, and
    wherein the line memory is configured to stop an operation of reading the image data in response to each of the plurality of pulses.

4. The image sensor of claim 2, wherein the image signal processing circuitry comprises:
    a plurality of image signal processors configured to sequentially perform the digital processing; and
    a plurality of line memory respectively corresponding to the plurality of image signal processors and each configured to store data on which the digital processing is to be performed by a corresponding one of the plurality of image signal processors,
    wherein the timing controller is configured to transfer the hold processing signal to the plurality of line memories, and
    wherein each of the plurality of line memories is configured to stop an operation of reading the data in response to each of the plurality of pulses.

5. The image sensor of claim 2, further comprising a processor configured to transfer predetermined information indicating a start time and a width of each of the plurality of pulses to the timing controller,
    wherein the timing controller is configured to generate the hold processing signal based on the predetermined information.

6. The image sensor of claim 5, further comprising a memory configured to store firmware,
    wherein the processor is configured to generate the predetermined information based on the firmware.

7. The image sensor of claim 6, wherein the processor is configured to:
    determine the width based on a time of the one horizontal cycle, a time required for the digital processing, and a number of times of the ADC processing; and
    determine the start time of each of the plurality of pulses based on start times of the ADC processing periods and an offset.

8. The image sensor of claim 1, wherein the image signal processing circuitry is configured to operate in response to a clock signal from the timing controller, and
    wherein the timing controller is configured to block the clock signal to be transferred to the image signal processing circuitry during the plurality of holding periods.

9. The image sensor of claim 8, wherein the image signal processing circuitry comprises a plurality of image signal processors configured to sequentially perform the digital processing and operate in response to the clock signal,
    wherein the timing controller is configured to block the clock signal to be transferred to the plurality of image signal processors during the plurality of holding periods.

10. The image sensor of claim 8, further comprising a processor configured to transfer predetermined information indicating a start time and a width of each of the plurality of holding periods to the timing controller, wherein the timing controller is configured to block the clock signal based on the predetermined information.

11. The image sensor of claim 1, wherein the timing controller is configured to control the image signal processing circuitry to allow power consumed in the image signal processing circuitry during each of the plurality of holding periods to be lower than a threshold.

12. The image sensor of claim 1, wherein the timing controller controls the image signal processing circuitry to allow a fluctuation value of power consumed in the image signal processing circuitry during each of the plurality of holding periods to be lower than a threshold.

13. An imaging system comprising:
    a first processor configured to provide start times of analog-to-digital conversion (ADC) processing and an offset;
    an image sensor configured to receive the start times and the offset from the first processor, and to control an operation of image signal processing based on the start times and the offset, the image sensor comprising:
        a second processor configured to generate predetermined information based on the start times and the offset; and
        a timing controller configured to hold the operation of the image signal processing, corresponding to portions of ADC processing periods in each of which the ADC processing is performed, wherein each of the portions are periods in which a digital code corresponding to least significant bits of a predetermined number or less is decided from a pixel signal by the ADC processing.

14. The imaging system of claim 13, wherein the image sensor further comprises a memory configured to store firmware, and
    wherein the second processor is configured to generate the predetermined information based on the start times and the offset using the firmware.

15. The imaging system of claim 13, wherein the image sensor is configured to perform the ADC processing twice or more during an operation period of one horizontal period, wherein the predetermined information includes a start time and a width of each of a plurality of hold pulses that respectively correspond to portions of two or more ADC processing periods in each of which the ADC processing is performed, and
    wherein the image sensor is configured to hold the operation of the image signal processing in response to each of the plurality of hold pulses.

16. A method executed by an image system, the method comprising:
    providing start times of analog-to-digital conversion (ADC) processing and an offset;
    generating predetermined information based on the start times and the offset, and
    controlling an operation of image signal processing based on the predetermined information while performing the ADC processing twice or more,
    wherein controlling the operation of image signal processing comprises controlling the operation of the image signal processing corresponding to each of portions of two or more ADC processing periods in each of which the ADC processing is performed, and
    wherein each of the portions is a period in which a digital code corresponding to least significant bits of a predetermined number or less is decided from a pixel signal by the ADC processing.

* * * * *